United States Patent
Okanoue

(10) Patent No.: US 6,243,758 B1
(45) Date of Patent: *Jun. 5, 2001

(54) INTERNETWORK MULTICAST ROUTING USING FLAG BITS INDICATING SELECTIVE PARTICIPATION OF MOBILE HOSTS IN GROUP ACTIVITIES WITHIN SCOPE

(75) Inventor: Kazuhiro Okanoue, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,576

(22) Filed: Jun. 5, 1997

(30) Foreign Application Priority Data

Jun. 6, 1996 (JP) .................................. 8-144295

(51) Int. Cl.[7] .............................................. G06F 15/173
(52) U.S. Cl. ....................... 709/238; 709/240; 455/432; 455/433; 455/435; 370/389; 370/392
(58) Field of Search .................................. 370/401, 352, 370/389, 390, 392, 432; 455/436, 518, 519, 520, 525, 432, 433, 435, 439, 410, 442; 395/200.68, 200.53; 709/238, 223

(56) References Cited

U.S. PATENT DOCUMENTS

| | | | |
|---|---|---|---|
| 5,325,362 | * 6/1994 | Aziz ...................................... | 370/94.3 |
| 5,331,637 | * 7/1994 | Francis et al. ....................... | 370/408 |
| 5,361,256 | * 11/1994 | Doeringer et al. ................... | 370/390 |
| 5,412,654 | * 5/1995 | Perkins ................................. | 370/312 |
| 5,422,880 | * 6/1995 | Heitkamp et al. ................... | 370/352 |
| 5,432,841 | * 7/1995 | Rimer .................................. | 455/457 |
| 5,442,633 | * 8/1995 | Perkins et al. ....................... | 370/94.1 |
| 5,491,834 | * 2/1996 | Chia .................................... | 455/441 |
| 5,517,494 | * 5/1996 | Green .................................. | 370/408 |
| 5,517,618 | * 5/1996 | Wada et al. ....................... | 395/200.53 |
| 5,519,706 | * 5/1996 | Bantz et al. ....................... | 370/85.3 |
| 5,572,528 | * 11/1996 | Shuen ................................. | 370/402 |
| 5,577,029 | * 11/1996 | Lu et al. ............................. | 455/445 |
| 5,583,996 | * 12/1996 | Tsuchiya ............................. | 709/218 |
| 5,594,943 | * 1/1997 | Balachandran ..................... | 455/436 |
| 5,602,903 | * 2/1997 | LeBlanc et al. .................... | 455/456 |
| 5,606,595 | * 2/1997 | Ejzak ................................... | 379/58 |
| 5,608,726 | * 3/1997 | Virgile ................................ | 370/401 |
| 5,615,215 | * 3/1997 | Utting et al. ....................... | 370/337 |
| 5,638,369 | * 6/1997 | Ayerst et al. ...................... | 370/346 |
| 5,655,219 | * 8/1997 | Jusa et al. .......................... | 455/338 |
| 5,678,185 | * 10/1997 | Chia .................................... | 455/437 |

(List continued on next page.)

OTHER PUBLICATIONS

Acharya et al., "Delivering Multicast Messages in Networks with Mobile Hosts", IEEE, 1993.*

(List continued on next page.)

*Primary Examiner*—Mehmet B. Geckil
*Assistant Examiner*—William C. Vaughn, Jr.
(74) *Attorney, Agent, or Firm*—Ostrolenk, Faber, Gerb & Soffen, LLP

(57) ABSTRACT

In a computer network formed by subnetworks in which a multicast scope is defined as a reachable extent of multicast packets, each host in the scope transmits a multicast packet containing a scope field indicating that transmission of the multicast packet beyond the scope is forbidden and a boundary flag indicating whether only those hosts within the scope are allowed to participate in a group activity or mobile hosts outside the scope are also allowed to participate in the group activity. Each router connected to the subnetworks of the scope receives a multicast packet and prevents it from being transmitted beyond the scope if the scope field is contained in the received packet. A home agent located within the scope receives a multicast packet and transmits it to a mobile host visiting the external subnetwork if the boundary flag of the received packet indicates that participation in the group activity is allowed.

4 Claims, 5 Drawing Sheets

U.S. PATENT DOCUMENTS

| | | | |
|---|---|---|---|
| 5,711,002 * | 1/1998 | Foti | 455/433 |
| 5,752,189 * | 5/1998 | Ueno et al. | 455/435 |
| 5,793,762 * | 8/1998 | Penners et al. | 370/389 |
| 5,815,808 * | 9/1998 | Valentine | 455/422 |
| 5,825,759 * | 10/1998 | Liu | 370/331 |
| 5,835,485 * | 11/1998 | Grube et al. | 370/312 |
| 5,862,345 * | 1/1999 | Okanoue et al. | 709/238 |
| 5,864,747 * | 1/1999 | Clark et al. | 455/3.2 |
| 5,883,890 * | 3/1999 | Okanoue et al. | 370/338 |
| 5,889,770 * | 3/1999 | Jokiaho et al. | 370/337 |
| 5,991,617 * | 11/1999 | Powell | 455/410 |
| 6,023,619 * | 2/2000 | Kaminsky | 455/411 |
| 6,081,715 * | 6/2000 | La Porta et al. | 455/445 |
| 6,085,086 * | 7/2000 | La Porta et al. | 455/432 |

OTHER PUBLICATIONS

Acharya et al., "IP Multicast Extensions for Mobile Internetworking", IEEE, 1996.*

Perkins, Network Working Group, RFC 2002, "IP Mobility Support", Oct. 1996.*

S. Deering, Host Extensions for IP Multicasting, Network Working Group, RFC 988, May 1988.*

Waitzman et al., Distance Vector Multicast Routing Protocol, Network Working Group, RFC 1075, Nob. 1988.*

F. Baker, Requirements for IP Version 4 Routers, Network Working Group, RFC 1812, Jun. 1995.*

Bhagwat et al., Network Layer Mobility: An Architecture and Survey, IEEE Personal Communications, Jun. 1996.*

Stephen E. Deering, "Multicast Routing in a Datagram Internetwork," dissertation submitted to Stanford University, pp. i–137, Dec. 1991.

* cited by examiner-

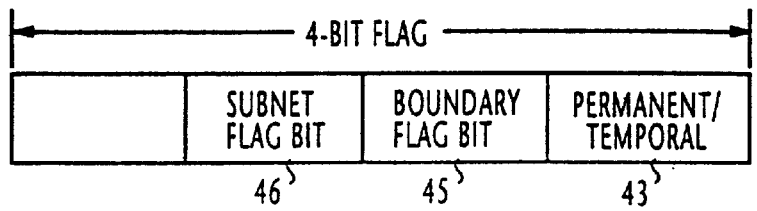
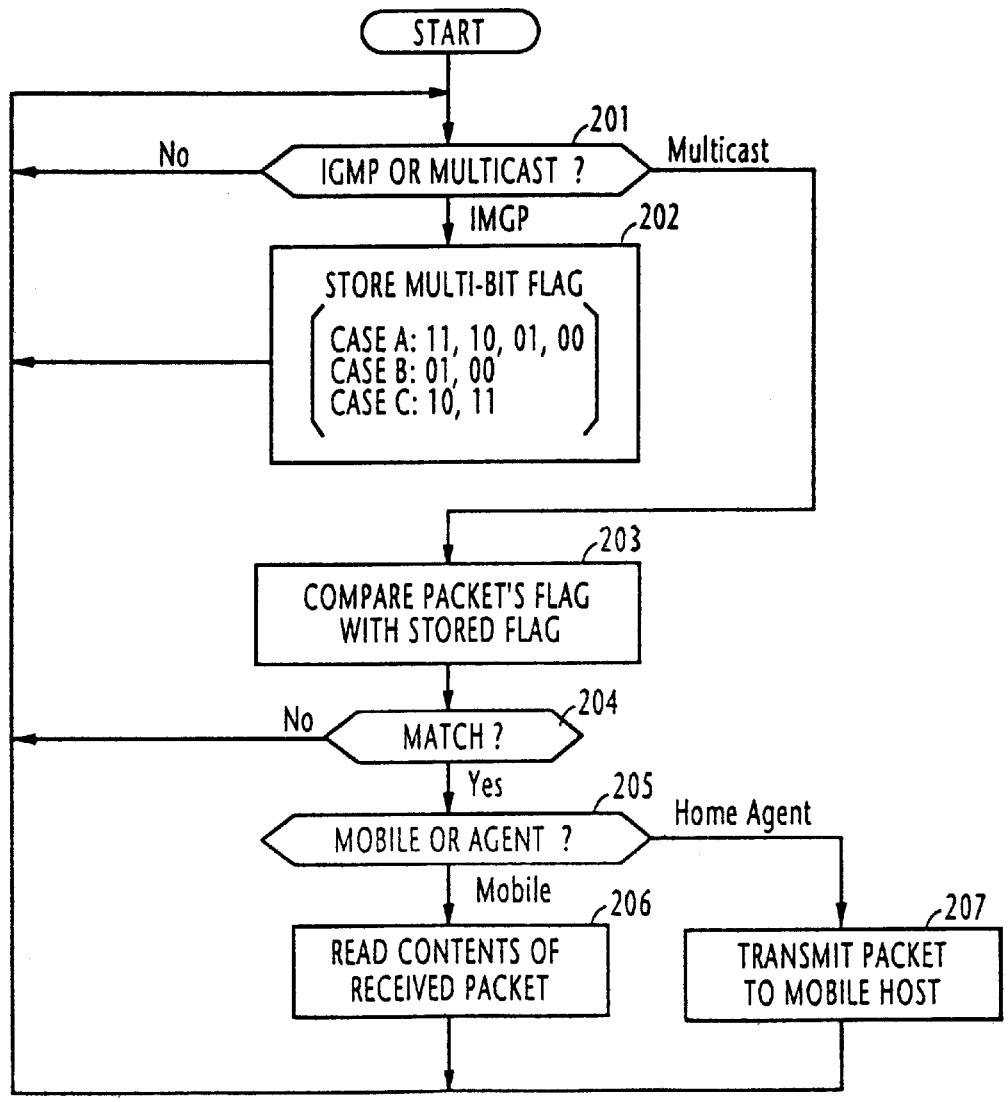

FIG. 10A CASE A
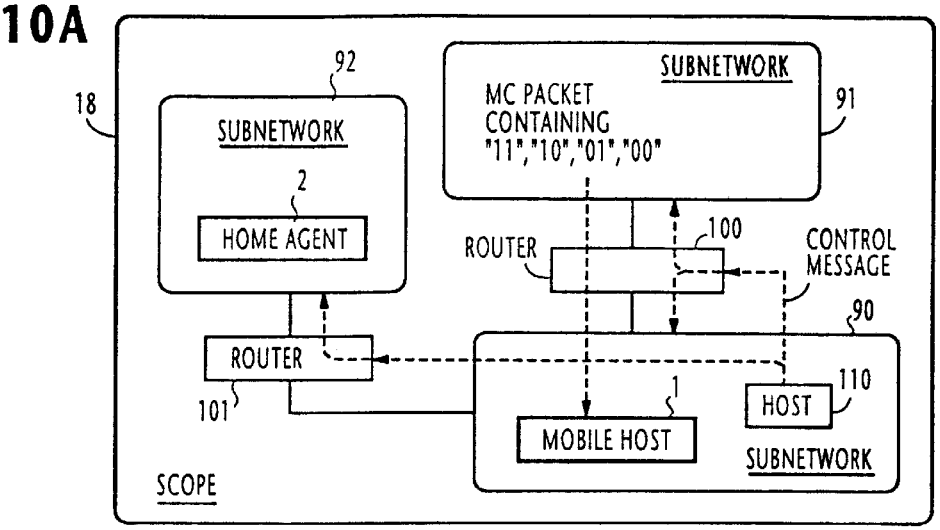
FIG. 10B CASE B
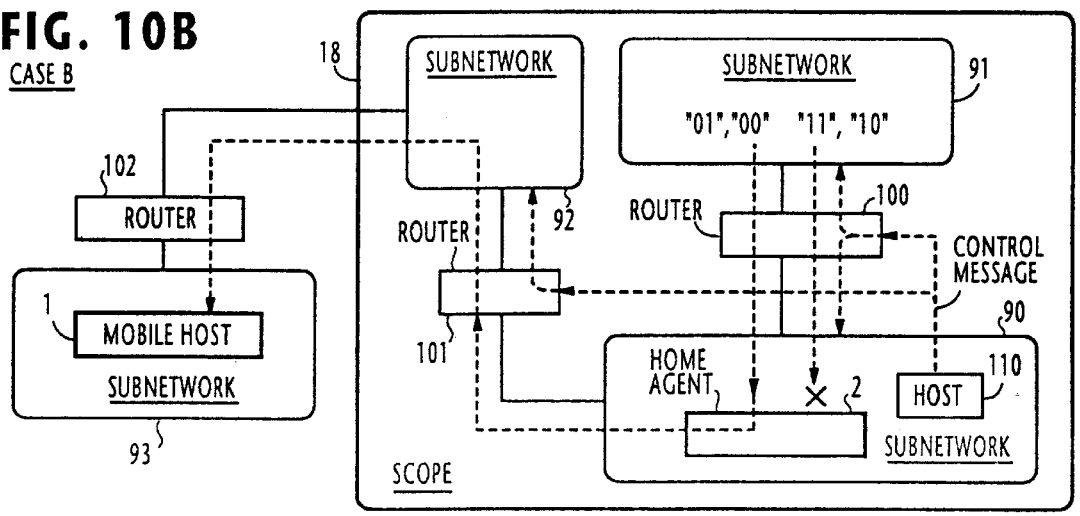
FIG. 10C CASE C
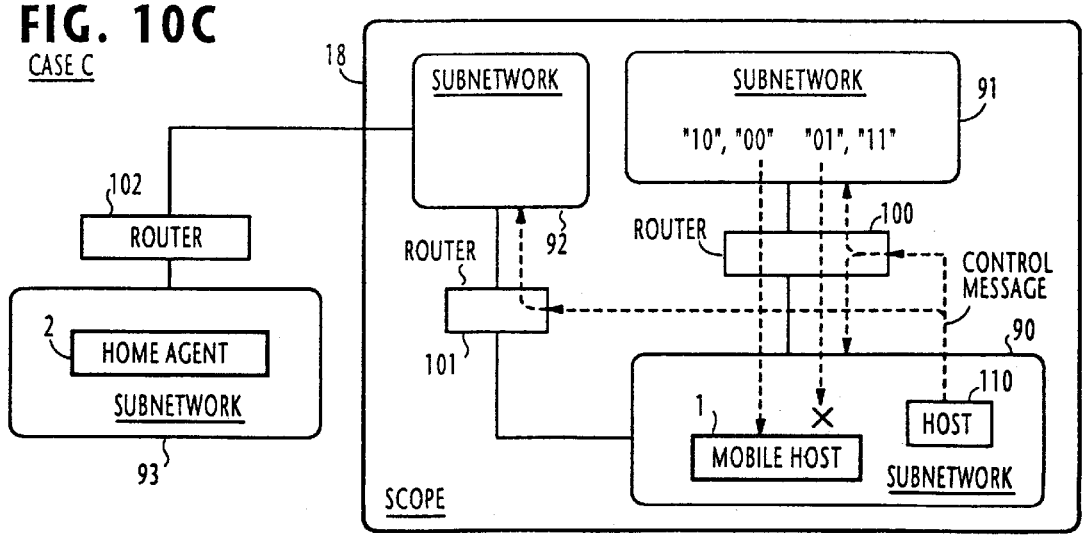

INTERNETWORK MULTICAST ROUTING USING FLAG BITS INDICATING SELECTIVE PARTICIPATION OF MOBILE HOSTS IN GROUP ACTIVITIES WITHIN SCOPE

BACKGROUND OF THE INVENTION

1. Field of the Invention

The present invention generally relates to computer networks, and more specifically to group-oriented multicast routing in an internetwork, wherein the reacheable extent of multicast packets is limited within an area, called "multicast scope".

2. Description of the Related Art

For multicast routing in an internetwork, the concept of "multicast scope" is described in a dissertation "Multicast Routing in a Datagram Internetwork" submitted to Stanford University, S. E. Deering, December 1991. An internetwork having a multicast scope (or simply scope) has the ability to limit the "scope" of a multicast transmission to reach only nearby destinations. As disclosed in "IP Version 6 Addressing Architecture" Request for Comment 1884, RFC 1884, December 1995, R. Hinden et al, a scope can be established by encapsulating a four-bit scope field in the address field of a multicast packet according to the internet protocol version 6. Using the scope field of a multicast packet, each router in the internetwork intercepts the packet and prevents it going beyond the boundary of the scope.

While there are a number of advantages for limiting the scope of a multicast, it is disadvantages for mobile hosts visiting a subnetwork external to the scope if they wish to, or are entitled to, participate in group activities within the scope. One approach is to encapsulate a multicast packet in the payload field of a unicast packet and send it from a home agent to an external mobile host. However, the number of unicast packets will increase with an increase in external mobile hosts, causing a significant increase in traffic.

SUMMARY OF THE INVENTION

It is therefore an object of the present invention to provide a computer network capable of selectively routing multicast packets to home mobile hosts visiting a subnetwork external to a scope or foreign mobile hosts visiting a subnetwork within the scope.

According to a first aspect of the present invention, there is provided a computer network comprising a plurality of subnetworks each comprising a plurality of interconnected hosts, the subnetworks forming a multicast scope which defines a reachable extent of multicast packets, and a plurality of routers interconnecting the subnetworks and further connecting the subnetworks to an external subnetwork. Each of the hosts which form a multicast group within the scope transmits a multicast packet containing a scope field indicating that transmission of the multicast packet beyond the scope is forbidden and a boundary flag indicating whether only hosts within the scope are allowed to participate in a group activity or mobile hosts outside the scope are also allowed to participate in the group activity. Each of the routers, on receiving a multicast packet, prevents it from being transmitted beyond the scope if the scope field is contained in the received packet. A home agent located within the scope receives a multicast packet and transmits it to a mobile host visiting the external subnetwork if the boundary flag of the received packet indicates that participation in the group activity is allowed.

According to a second aspect, the present invention provides a computer network comprising a plurality of subnetworks each comprising a plurality of interconnected hosts, the subnetworks forming a multicast scope which defines a reachable extent of multicast packets, and a plurality of routers interconnecting the subnetworks and further connecting the subnetworks to an external subnetwork. Each of the hosts which form a multicast group within the scope transmits a multicast packet containing a scope field indicating that transmission of the multicast packet beyond the scope is forbidden and a group identifier identifying the group. Each of the routers, on receiving a multicast packet, prevents it from being transmitted beyond the scope if the scope field is contained in the received packet. One of the hosts within the scope transmits a control message containing a group identifier and a boundary flag indicating whether only hosts within the scope are allowed to participate in a group activity or mobile hosts outside the scope are also allowed to participate in the group activity. A home agent within the scope receives the control message, stores the group identifier and boundary flag of the received message, and subsequently receives a multicast packet, and transmits the packet to a mobile host visiting the external subnetwork if the stored subnet flag indicates that participation of outside mobile hosts in group activity is allowed when the stored group identifier coincides with the group identifier of the received packet.

According to a third aspect, the present invention provides a computer network comprising a plurality of subnetworks each comprising a plurality of interconnected hosts, the subnetworks forming a multicast scope which defines a reachable extent of multicast packets, and a plurality of routers interconnecting the subnetworks and further connecting the subnetworks to an external subnetwork. Each of the hosts which form a multicast group within the scope transmitting a multicast packet containing a scope field indicating that transmission of the multicast packet beyond the scope is forbidden and a subnet flag indicating whether only hosts attached to one of the subnetworks within the scope are allowed to participate in a group activity or mobile hosts outside the subnetwork are also allowed to participate in the particular group activity. Each of the routers, on receiving a multicast packet, prevents it from being transmitted beyond the scope if the scope field is contained in the received packet. A mobile host of the external subnetwork receives a multicast packet when visiting one of the subnetworks within the scope, and reads the contents of the received packet if the subnet flag of the received packet indicates that participation of outside mobile hosts in a group activity is allowed.

According to a further aspect, the computer network of the present invention comprises a plurality of subnetworks each comprising a plurality of interconnected hosts, the subnetworks forming a multicast scope which defines a reachable extent of multicast packets, and a plurality of routers interconnecting the subnetworks and further connecting the subnetworks to an external subnetwork. One of the hosts within the scope transmits a control message to the routers so that the control message is relayed to the subnetworks within the scope, the control message containing a multi-bit flag indicating one of a plurality of group activities. Each of the hosts which form a multicast group within the scope receives the control message, stores the multi-bit flag of the message, and transmits a multicast packet containing a scope field indicating that transmission of the multicast packet beyond the scope is forbidden and the stored multi-bit flag. Each of the routers, on receiving a multicast packet, prevents it from being transmitted beyond the scope if the scope field is contained in the received packet. A mobile host located within the scope receives the control message, stores the multi-bit flag contained therein, receives a multicast packet, and reads contents of the received packet if a multi-bit flag contained in the packet coincides with the stored multi-bit flag. Alternatively, a home agent within the scope receives the control message, stores the multi-bit flag of the message, receives a multicast packet, and transmits the received packet to a mobile host visiting the external subnetwork if a multi-bit flag contained in the received packet coincides with the stored multi-bit flag.

BRIEF DESCRIPTION OF THE DRAWINGS

The present invention will be described in further detail with reference to the accompanying drawings, in which:

FIG. 9 is an address format used in a fourth embodiment of this invention;

FIGS. 10A, 10B and 10C are block diagrams of simplified computer networks of different configuration and multicast grouping for incorporating combined multicast group routing algorithm, using the format of FIG. 9; and FIG. 11 is a flowchart of the operation of a mobile host and a home agent in the networks of FIGS. 10A, 10B and 10C.

DETAILED DESCRIPTION

Figure 1:
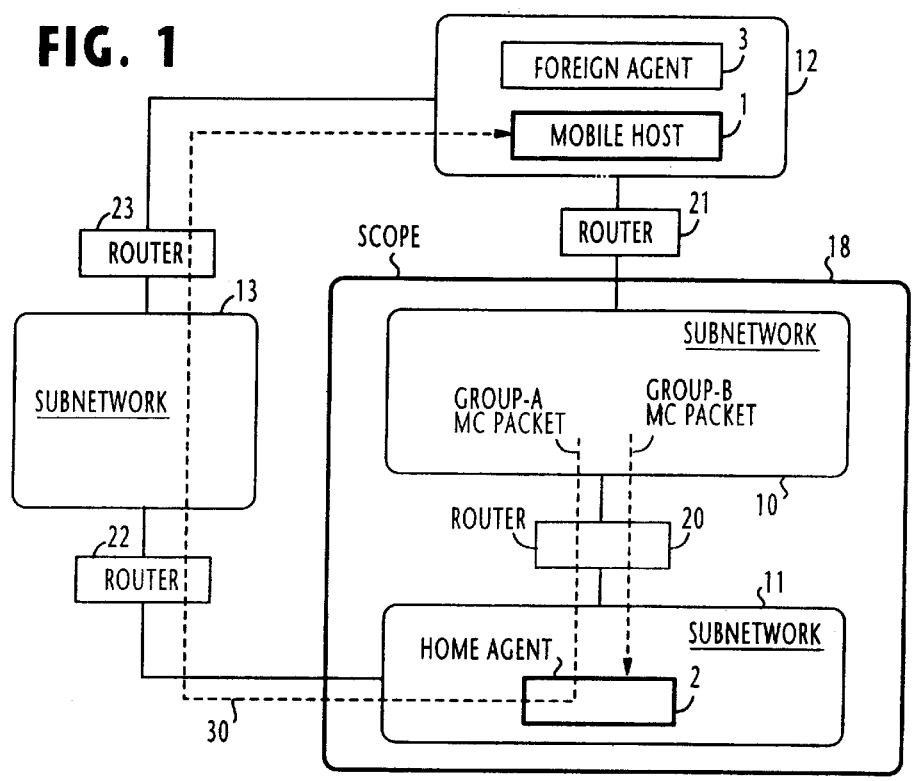
FIG. 1 is a block diagram of a simplified computer network for incorporating an outgoing multicast group routing algorithm according to a first embodiment of the present invention.

Referring now to FIG. 1, a simplified computer network is illustrated. The network is divided into a plurality of subnetworks (or subnets) 10, 11, 12 and 13. These subnetworks are interconnected by routers 20, 21, 22, 23. Subnetworks 10 and 11 are covered by an area 18, called "multicast scope" which limits the range of a multicast transmission from a multicast member group to reach only nearby destinations. Stationary and mobile hosts whose home locations are within multicast scope 18 may become a member of one or more multicast groups. According to the present invention, mobile hosts external to scope 18 are allowed to participate in the activities of these groups if these groups permit them to. The distance reached by multicast packets sent from the members of the groups is limited to within scope 18.

Each subnet has one or more "foreign agents", which keep track of all mobile users visiting the subnet. In addition, each subnet has a "home agent", which keeps track of users whose home is in the subnet. In the illustrated example, a mobile host 1 whose home is in subnet 11 is now visiting subnet 12. The mobile user's home agent is indicated by numeral 2 and the mobile user's foreign agent is indicated by numeral 3. Mobile host 1 belongs to multicast group A.

When a new mobile user enters a subnetwork, either by connecting to it, or just wandering into the cell, the user must register itself with the foreign agent there. The usual registration procedure typically works as follows:

At periodic intervals, each foreign agent broadcasts a packet announcing its existence and address. A newly arrived mobile host may wait for one of these messages, but if none arrives quickly enough, the mobile host can broadcast a packet looking for a foreign agent. The mobile host registers with the foreign agent, giving its home address, current data link layer address, and some security information. The foreign agent informs the mobile host's home agent of the visiting of its user. The message from the foreign agent to the home agent contains the foreign agent's network address, the security information to convince the home agent that the mobile host is really there. The home agent examines the security information, which contains a time stamp, to prove that it was generated within the past few seconds. If so, the home agent tells the foreign agent to proceed. When the foreign agent receives the acknowledgment from the home agent, it makes an entry in its tables and informs the mobile host that it is now registered.

When a packet (datagram) is sent to a mobile host, it is routed to the user's home address. Packets sent to the mobile host on its home address are intercepted by the home agent. The home agent then looks up the mobile user's new (temporary) location and finds the address of the foreign agent handling the mobile host. The home agent then encapsulates the packet in the payload field of a packet and sends it to the foreign agent. This mechanism is called "tunneling". On receiving the encapsulated packet, the foreign agent removes the original packet form the payload field and sends it to the mobile host as a data link frame. Then, the home agent tells the sender to henceforth send packets to the mobile host by encapsulating them in the payload of packets explicitly addressed to the foreign agent, instead of just sending them to the mobile host's home adders. Subsequent packets can now be routed directly to the mobile host via the foreign agent, bypassing the home location entirely.

It is assumed that two multicast groups A and B are formed within scope 18 and that the group A is one that allows its member hosts to participate in its activity even though they are outside of scope 18, while group B allows none of its members to participate in its activity when they are outside of scope 18. Therefore, it is only multicast packets of group A that must be relayed by home agent 2 to mobile host 1 over a route 30 which may pass through subnet 13. Group-B multicast packets must be blocked by home agent 2 by not relaying the packets to the group-A mobile host.

Figure 2:
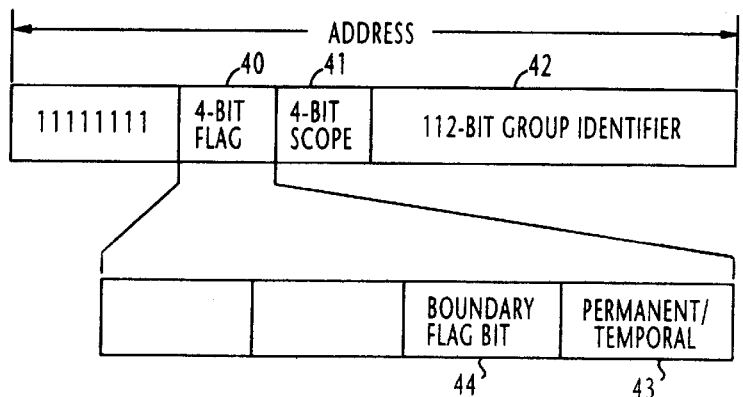
FIG. 2 is an address format used in the first embodiment of this invention.

This outgoing multicast group routing is implemented by having all hosts (members) of groups A and B within scope 18 send multicast packets with an address having the format of FIG. 2. The Internet protocol version 6 specifies that the address of the multicast packet should contain a 4-bit flag field 40, a scope field 41 and a group identifier 42. The 4-bit flag is represented by a permanent/temporal bit-field 43 for indicating whether the multicast address is permanent or temporal. The routers examine the scope field of the multicast packet to prevent it from going outside of the scope.

According to the present invention, a boundary flag bit-field 44 is provided in the flag field 40. The boundary flag bit-field 44 indicates whether participation of a mobile host in a particular group activity should be allowed or not. With a bit "1", the boundary flag indicates that only those hosts within the scope are allowed to participate in a group activity, and with a bit "0" it indicates that not only those hosts within the scope but also mobile hosts outside the scope are allowed to participate in the group activity.

Figure 3:
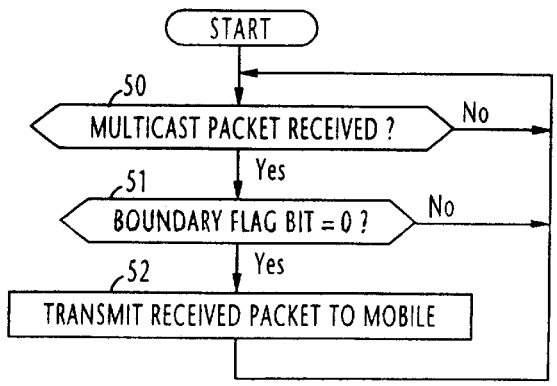
FIG. 3 is a flowchart of the operation of the home agent of FIG. 1.

When a multicast packet of the FIG. 2 format is transmitted from a host in the subnet 10, the home agent 2 executes a routine illustrated in the flowchart of FIG. 3. When home agent 2 receives such a multicast packet (step 50), it proceeds to step 51 to examine the boundary flag bit-field 44. If the boundary flag bit is "0", flow proceeds from step 51 to step 52 to transmit the received packet to the mobile host 1. If the boundary flag bit is "1", flow returns to step 50.

If a multicast packet is sent from a group-A user in the subnet 10 and the mobile host 1 is to be allowed to participate in the activity of group A, then the sender host sets a "0" in the boundary flag bit of the packet and forwards it into the network. On receiving the packet, the home agent 2 recognizes that mobile hosts visiting a foreign subnet are allowed to participate in the group-A activity. Since the home agent 2 is aware of the current location of mobile host 1, it encapsulates the received packet in the payload field of an IGMP (internet group management protocol) packet, looks up its least-cost routing table and sends (i.e., tunnels) the packet to the mobile host over a least cost route 30 which may pass through the subnet 13.

If a multicast packet is sent from a group-B user in the subnet 10 and the mobile host 1 is not allowed to participate in the activity of group B, then the sender host sets a "1" in its boundary flag bit and forwards the packet into the network. On receiving the packet, the home agent 2 recognizes that the mobile host 1 is not allowed to participate and does not send it to the mobile host.

Figure 4:
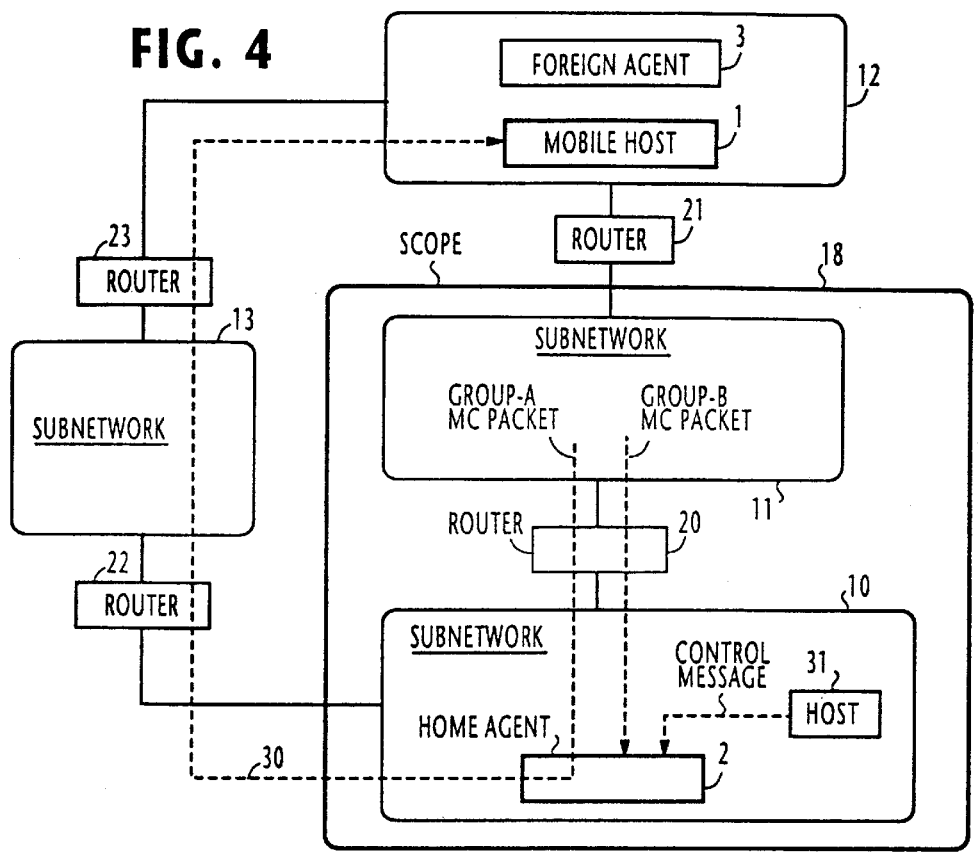
FIG. 4 is a block diagram of a simplified computer network for incorporating an intra-scope multicast group routing algorithm according to a second embodiment of the present invention.

Alternatively, the outgoing multicast group routing of this invention is implemented by having one of the hosts within scope 18 send a control message to the home agent 2 as shown in FIG. 4. This control message contains the multicast address of FIG. 2. However, hosts within scope 18 adopt protocols different from that shown in FIG. 2, so that the multicast address field of each packet has no boundary flag bit-field.

Figure 5:
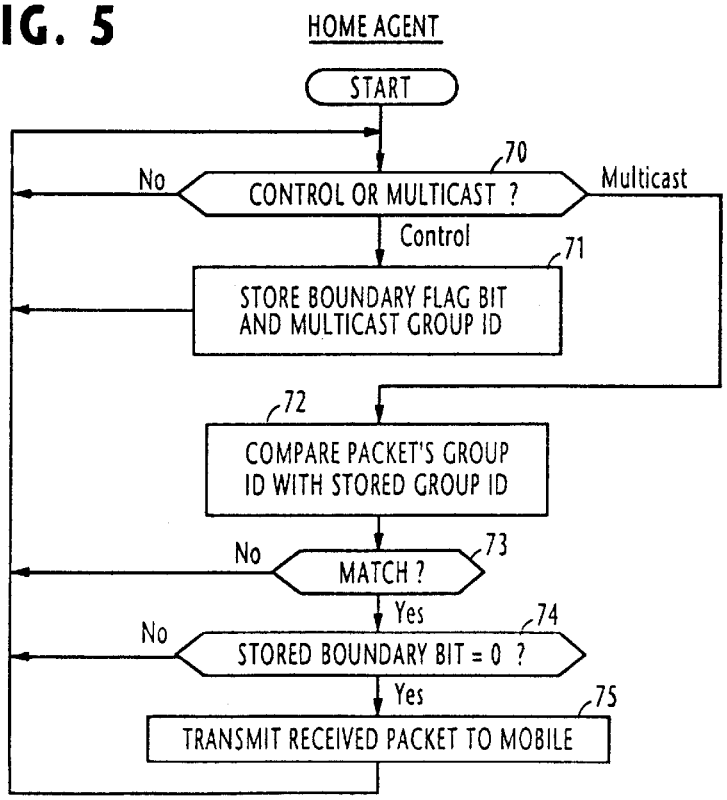
FIG. 5 is a flowchart of the operation of the home agent of FIG. 4.

When the home agent 2 receives a control message containing the address of the FIG. 2 format from a host 31, it executes a routine illustrated in the flowchart of FIG. 5. On receiving such a control message (step 70), home agent 2 proceeds to step 71 to store the boundary flag bit and multicast group identifier of the control message in memory and returns to step 70. When a multicast packet is subsequently received from a host of any of groups A and B (step 70), the home agent 2 proceeds to step 72 to compare a group identifier contained in the packet with the stored group identifier. If there is a match (step 73), the home agent proceeds to step 74 check to see if the stored boundary flag bit is equal to 0. If so, the home agent recognizes that a mobile host 1 is allowed to participate a group activity, and proceeds to step 75 to transmit the received multicast packet to the mobile host 1 and then returns to step 70. If no match is detected at step 73 or 74, flow returns to step 70.

Figure 6:
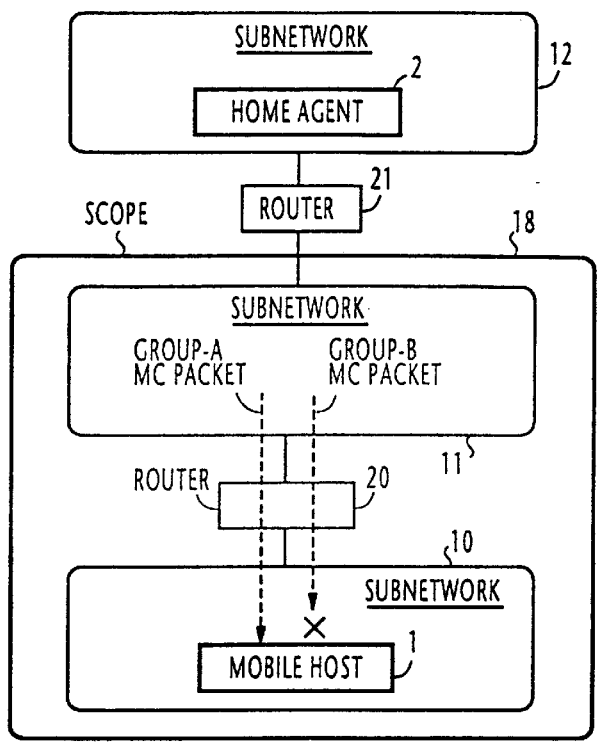
FIG. 6 is a block diagram of a simplified computer network for incorporating an intra-scope multicast group routing algorithm according to a third embodiment of the present invention.

Assume that a mobile user of a subnet external to scope 18 is visiting one of the subnets of scope 18. If multicast group A allows such external members to participate in its activity in addition to its internal members, while multicast group B only allows its internal members to participate in its activity, then the mobile host 1 visiting subnet 10 must be allowed to read the contents of a multicast packet sent from any group-A host, while it is not allowed to read the contents of a multicast packet from any group-B host, as illustrated in FIG. 6.

Figure 7:
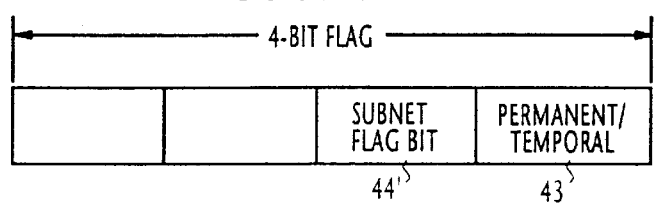
FIG. 7 is an address format used in the third embodiment of this invention.

This intra-scope multicast group routing is implemented by having each host within scope 18 send a multicast packet with an address of the format of FIG. 7, which differs from the address format of FIG. 2 in that the boundary flag bit of the latter is replaced with a subnet flag bit-field 44' in FIG. 4. The subnet flag bit-field indicates whether participation in a particular group activity should be allowed or not. With a bit "1", the subnet flag indicates that only those hosts attached to a subnetwork within the scope are allowed to participate in a group activity, and with a bit "0" it indicates that not only those hosts attached to the subnetwork within the scope but also mobile hosts outside the subnetwork are allowed to participate in the particular group activity.

Figure 8:
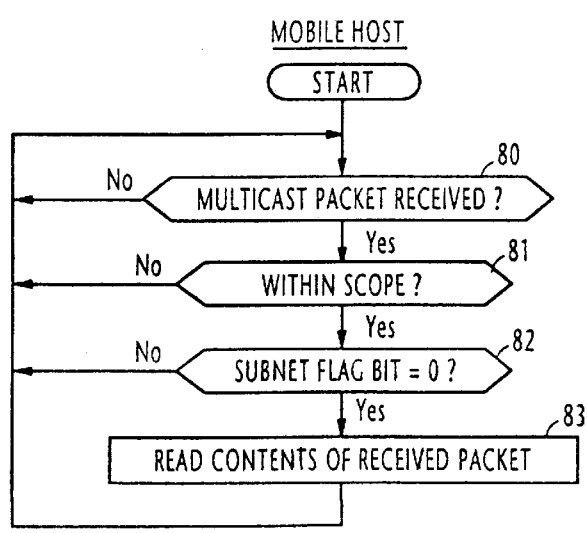
FIG. 8 is a flowchart of the operation of an external mobile host of FIG. 6 within a scope.

In addition, a visiting external mobile host is programmed to execute a routine shown in FIG. 8. In FIG. 8, when the mobile host 1 visiting subnet 10 receives a multicast packet (step 80), flow proceeds to step 81 where the mobile host uses its home and current location data and the packet's address and determines whether it is located within scope 18. If so, flow proceeds to step 82 to examine the subnet flag bit and determine whether it is "1" or "0". If the subnet flag bit is "0", flow proceeds from step 82 to step 83 where the mobile host is allowed to read the contents of the received packet. If the subnet flag bit is "1", flow returns to step 80.

The boundary and subnet flag bits can be combined to produce two-bit flags (11), (10), (01) and (00) to represent four group activities w(=11), x(=10), y(=01) and z(=00), respectively.

Another embodiment of this invention uses the two-bit flags to provide a flexible network configuration and multicast grouping. In this embodiment, a host in the scope 18 sends a control message to all routers of scope 18 to inform them of the multicast address of its group. The multicast address is then encapsulated in the payload field of an IGMP packet and sent from each router to all hosts within the scope 18. In response, each host removes the multicast address from the payload field of the received packet and stores it in memory.

FIG. 9 shows a format of the 4-bit flag field of such a multicast address. As illustrated, the 4-bit flag field of the multicast address contains a boundary flag bit-field 45 and a subnet flag bit-field 46 in addition to the permanent/temporal bit-field 43. The boundary and subnet flag bits of each group are stored in each member host within scope 18. When this host subsequently sends a multicast packet, it places the stored flag bits into the corresponding bit-fields of the packet.

Each host within scope 18 uses the stored flag bits to determine whether mobile hosts to be allowed to participate in a group activity in the following three cases:

Case A: A home mobile host 1 is currently located within scope 18 (see FIG. 10A). It is assumed that groups that use flags "11", "10", "01" and "00" allow any home mobile hosts to participate in their activities.

Case B: A home mobile host 1 is currently away from home subnetwork and located outside of scope 18 (see FIG.

10B). It is assumed that groups that use flags "01" and "00" allow the away-from-home mobile user to participate in their activities, and groups using flags "11" and "10" do not allow participation in their activities.

Case C: A foreign mobile host 1 is currently visiting scope 18 (see FIG. 10C). It is assumed that groups using flag bits "10" and "00" allow the visiting foreign user to participate in their activities, and groups using "01" and "11" do not allow participation in their activities.

FIG. 10A shows a network corresponding to case A in which subnetworks 90, 91 and 92 are all located within scope 18 and interconnected by routers 100 and 101. The home agent 2 is located in subnet 92 and its mobile host 1 in subnet 90. FIG. 10B shows a network corresponding to case B in which a subnetwork 93 is located outside of scope 18 and connected by a router 102 to subnetwork 92. Subnetworks 90, 91 and 92 are located within scope 18 in the same manner as in FIG. 10A. In FIG. 10B, the home mobile host 1 of subnet 90 is currently visiting subnet 93. FIG. 10C shows a network corresponding to case C in which the network configuration is identical to that of FIG. 10B and the home mobile host 1 of subnet 93 is currently visiting subnet 90.

In FIGS. 10A, 10B and 10C, a host 110 in subnet 90 sends a control message containing a multicast address of the format of FIG. 9 to routers 100 and 101. On receiving the control message, each router removes the multicast address from the received message and encapsulates it in the payload field of an IGMP packet and sends it to all hosts of its associated subnet(s). On receiving the IGMP packet, each host removes the multicast address from the received packet and stores it in memory. If a host of any group subsequently wishes to send a multicast packet, it looks up the memory and encapsulates appropriate flag bits into the address field of the packet and forwards it into the network.

The flowchart of FIG. 11 is executed by the mobile host of FIGS. 10A and 10C and by the home agent of FIG. 10B. When an IGMP packet is received from host 110 (step 201), the boundary and subnet flag bits and the multicast group identifier of the packet are stored in memory (step 202) and flow returns to step 201. For example, if the mobile host is in the network configuration of FIG. 10B, a flag "01" or "00" will be transmitted by an IMGP packet and stored in memory if participation of external mobile hosts is allowed. When a multicast packet is subsequently received (step 201), flow proceeds to step 203 to further look up the memory and compare the stored flag with the packet's flag. If they match (step 204), the contents of the received packet are read by the mobile host if the latter is executing the routine (steps 205, 207), or the received packet is transmitted from the home agent to the mobile host visiting an external subnetwork if the home agent is executing the routine (steps 205, 207).

What is claimed is:

1. A computer network comprising:
 a plurality of subnetworks each comprising a plurality of interconnected hosts, said subnetworks forming a multicast scope which defines a reachable extent of multicast packets and said hosts forming at least one multicast group within said multicast scope;
 a plurality of routers interconnecting said subnetworks and further connecting said subnetworks to an external subnetwork;
 each of the hosts transmitting a multicast packet containing a scope field indicating that transmission of the multicast packet beyond the scope is forbidden and a flag indicating whether only hosts within the scope are allowed to participate in a group activity or mobile hosts outside the scope are also allowed to participate in the group activity;
 each of said routers, on receiving a multicast packet, preventing the received packet from being transmitted beyond said scope if said scope field is contained in the received packet;
 a home agent within said scope;
 a foreign agent within said external subnetwork for acquiring home location of a mobile host visiting the external subnetwork and informing said home agent of current location of the visiting mobile host and address of the foreign agent; and
 said home agent, on receiving said multicast packet, encapsulating the received packet in a payload field of a packet and transmitting the packet to said foreign agent if the flag of the inulticast packet indicates that participation of mobile hosts outside the scope in the group activity is allowed,
 said foreign agent, on receiving said packet from the home agent, forwarding the payload of the received packet to the visiting mobile host;
 wherein said multicast packet further contains a subnet flag indicating whether only hosts attached to one of the subnetworis within the scope are allowed to participate in a group activity or mobile hosts outside the subnetwork are also allowed to participate in the particular group activity, and
 wherein a mobile host of said external subnetwork is arranged to:
  receive said multicast packet when visiting one of said subnetworks within said scope, and
  read contents of the received multicast packet if the flag of the received multicast packet indicates that participation of outside mobile host in a group activity is allowed.

2. A computer network comprising:
 a plurality of subnetworks each comprising a plurality of interconnected hosts, said subnetworks forming a multicast scope which defines a reachable extent of multicast packets and said hosts forming at least one multicast group within said multicast scope;
 a plurality of routers interconnecting said subnetworks and further connecting said subnetworks to an external subnetwork;
 each of the hosts transmitting a multicast packet containing a scope field indicating that transmission of the multicast packet beyond the scope is forbidden and a group identifier identifying said group;
 each of said routers, on receiving a multicast packet, preventing the received packet from being transmitted beyond said scope if said scope field is contained in the received packet;
 one of said hosts within said scope transmitting a control message containing said group identifier and a flag indicating whether only hosts within the scope are allowed to participate in a group activity or mobile hosts outside the scope are allowed to participate in the group activity;
 a home agent within said scope;
 a foreign agent within said external subnetwork for acquiring home location of a mobile host visiting the external subnetwork and informing said home agent of current location of the visiting mobile host and address of die foreign agent; and said home agent, on receiving said control message, storing the group identifier and flag of the received message, and on receiving the multicast packet, encapsulating the received packet in a payload field of a packet and transmitting the packet to said foreign agent if the stored flag indicates that participation of outside mobile hosts in group activity is allowed and if the stored group identifier coincides with the group identifier of the received multicast packet, said foreign agent, on receiving said packet from the home agent forwarding the payload of the received packet to the visiting mobile host;

wherein said multicast packet further contains a subnet flag indicating whether only hosts attached to one or the subnetworks within the scope are allowed to participate in a group activity or mobile hosts outside the subnetwork are also allowed to participate in the particular group activity, and wherein a mobile host of said external subnetwork is arranged to:
  receive said control message when visiting one of said subnetworks within said scope,
  store the flag contained in the received control message,
  receive said multicast packet, and
  read contents of the received multicast packet if the stored flag of the control message indicates that participation of outside mobile hosts in a group activity is allowed.

3. A computer network comprising:

a plurality of subnetworks each comprising a plurality of interconnected hosts, said subnetworks forming a multicast scope which defines a reachable extent of multicast packets and said hosts forming at least one multicast group within said multicast scope;

a plurality of routers interconnecting said subnetworks and further connecting said subnetworks to an external subnetwork;

one of the hosts within said scope transmitting a control message to said routers so that the control message is relayed to the subnetworks within said scope, said control message containing a group activity identifier identifying one of a plurality of group activities;

each of the hosts transmitting a multicast packet containing a scope field indicating that transmission of the multicast packet beyond the scope is forbidden, and on receiving said control message, storing the group activity identifier contained therein and transmitting a multicast packet containing the stored group activity identifier;

each of said routers, on receiving the multicast packet, preventing the received multicast packet from being transmitted beyond said scope if said scope field is contained in the received multicast packet;

a home agent within said scope;

a foreign agent within said external subnetwork for acquiring home location of a mobile host visiting the external subnetwork and informing said home agent of current location of the visiting mobile host and address of the foreign agent; and said home agent, on receiving the control message, storing the group activity identifier contained therein, and on receiving the multicast packet, encapsulating the received multicast packet in a payload field of a packet and transmitting the packet to said foreign agent if the group activity identifier of the received multicast packet coincides with the stored group activity identifier of the control messages, said foreign agent, on receiving said packet from the home agent, forwarding the payload of the received packet to the visiting mobile host.

4. A computer network as claimed in claim 3, wherein a mobile host of said external subnetwork when visiting one of the subnetworks of said scope is arranged to:

receive the control message and store the group activity identifier of the control message, and receive the multicast packet and read contents if the group activity identifier of the received multicast packet coincides with the stored group activity identifier of the control message.

* * * * *